Oct. 4, 1949.  F. HINRICHS  2,483,581
VALVE
Filed June 18, 1945
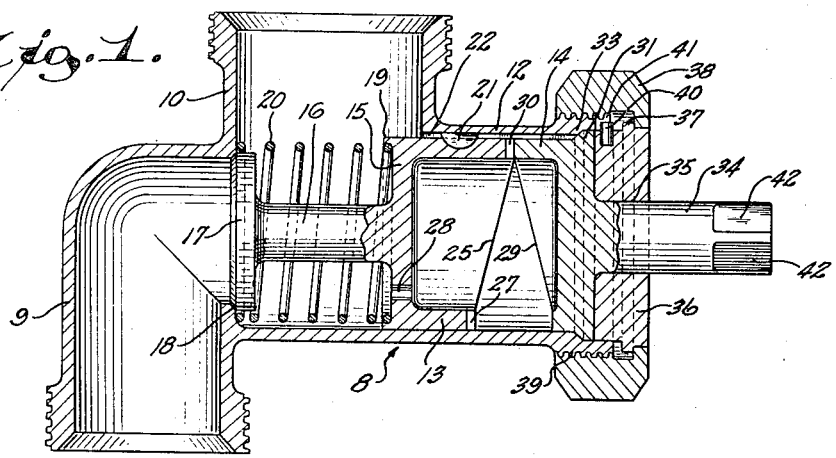
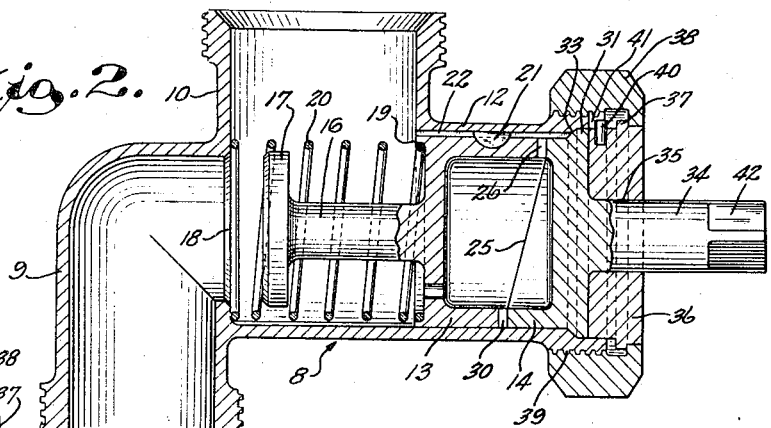
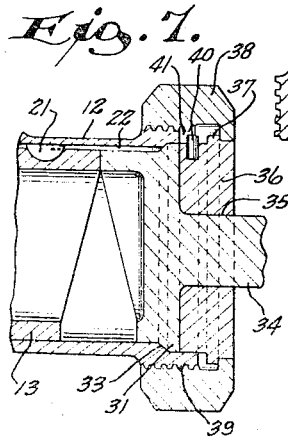
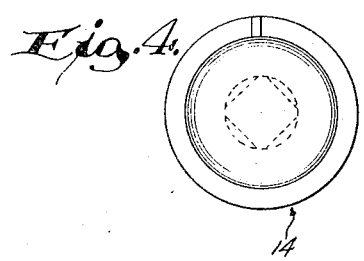
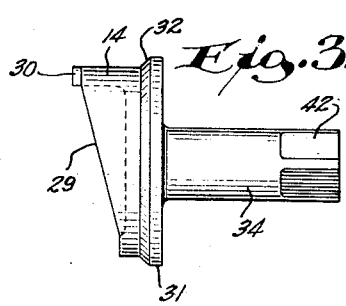
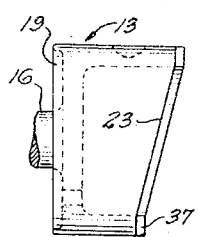
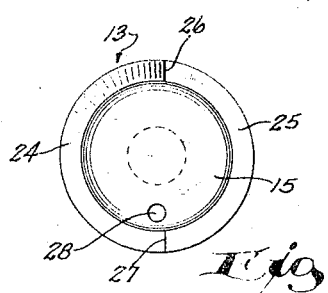
INVENTOR.
Ferdinand Hinrichs
BY
Morsell & Morsell
ATTORNEYS.

Patented Oct. 4, 1949

2,483,581

UNITED STATES PATENT OFFICE 2,483,581

VALVE

Ferdinand Hinrichs, Kenosha, Wis., assignor to Tri-Clover Machine Co., Kenosha, Wis., a corporation of Wisconsin Application June 18, 1945, Serial No. 600,142

2 Claims. (Cl. 251—132)

This invention relates to improvements in valves.

It is the general object of the present invention to provide a valve more particularly adapted for use in dairy equipment or in other equipment used in the food industry where sanitary conditions are required, the valve being so constructed as to eliminate all threading on the operating parts within the valve casing.

A further object of the invention is to provide an improved valve which is quick acting in both directions, there being a spring so arranged as to provide a positive motivating force on the plunger when the valve is opening. The construction is so arranged that a mere twist of the operating lever causes instantaneous opening or closing.

A more specific object of the invention is to provide a valve of the class described, wherein cam mechanism is employed for quickly urging the valve into closing position against the tension of the spring, said cam mechanism also being employed to quickly free the valve so that the spring can move it into open position.

A further object of the invention is to provide a valve which is simple in construction; positive in action; and in which all parts may be easily removed for thorough cleaning whenever desired.

In the accompanying drawing, illustrating preferred embodiments of the invention, in which the same reference numerals designate the same parts in all of the views:

Fig. 1 is a longitudinal sectional view through the valve showing the valve in closed position;

Fig. 2 is a similar view showing the valve in open position;

Fig. 3 is a side elevational view of the outer cam member and operating extension;

Fig. 4 is an end view of said member;

Fig. 5 is a side elevational view of the inner slidable cam member;

Fig. 6 is an end view of the member shown in Fig. 5; and

Fig. 7 is a fragmentary longitudinal sectional view through a portion of the valve assembly showing a modified construction for the cam members.

Referring more particularly to the drawing, the numeral 8 designates the casing of an angle globe valve. The casing, however, may be any one of a number of types and the angle globe valve is shown merely for purposes of illustration. The casing is formed with an angular extension 9 adapted to be connected to a conduit through which material is adapted to flow. The casing also includes another tubular extension 10 and a tubular extension 12. The latter is circular in cross-section and forms a housing for an inner axially slidable cam member 13 and for an outer rotatable cam or actuating member 14. The inner cam member 13 is preferably cup-shaped and includes a closed end 15 to which the valve stem 16 is connected. The inner end of the valve stem is connected to a valve 17 and the latter coacts with an annular seat 18 in the usual manner.

The closed end of the cam member 13 is also formed with an inwardly projecting rim 19 within which one end of a coil spring 20 is seated. The other end of the coil spring engages the valve casing around the valve seat. The coil spring is of such diameter that the valve member 17, during its axial movement, may move within the coil as shown in Figs. 1 and 2.

In order to prevent rotating movement of the inner cam member 13 a key 21 is employed which engages and moves longitudinally in a slot 22 formed longitudinally in the inner surface of the casing extension 12.

The rim at the outer end of the inner cam member 13 is cut angularly as at 23 (see Fig. 5), so that the rim forms a circular cam surface. A portion of the rim designated by the numeral 24 in Fig. 6 is lower than the opposite portion 25 and there are shoulders 26 and 27 between said high and low portions. The member 13 may have its closed end 15 formed with a drainage hole 28.

The outer cam member 14 has its rim cut angularly as at 29 to conform to the cooperating rim of the inner cam member when the parts are in the position of Fig. 2. On the high portion of the rim of the member 14 is an engaging lug 30 which normally engages and rides along the surface 24 of the inner cam member 13. Engaging lug 30 is movable upon rotation of the outer cam member from the stop shoulder 27 to the stop shoulder 26.

While it is preferred to utilize the oppositely disposed high and low areas 24 and 25 in conjunction with the engaging lug 30, nevertheless this stop feature may be eliminated, if desired, as shown in Fig. 7, where the engaging lug 30 is omitted from the cam member 14 and where the stop shoulders 26 and 27, separating the high and low areas 24 and 25, are eliminated from the inner cam member 13. The construction illustrated in Fig. 7 is otherwise the same in all respects.

The outer end of the cam member 14 has an enlarged head forming a projecting annular flange 31. The inner face of said flange is angled as at 32 to coact with an annular tapered seat 33 at the end of the valve casing extension 12. An operating stud 34 projects outwardly from the center of the cam member 14 and rotatably through a central hole 35 in a disc 36. The disc 36 is formed with an annular rib 37 which is engaged by the flange of a union nut 38 when the parts are in assembled condition. The union nut is threaded on external threading 39 at the outer end of the casing extension 12. In order to prevent undesired rotation of the disc 36 during use of the valve, a pin 40 which coacts with a slot 41 in the casing extension 12, may be utilized. The outer end of the stud 34 may have flattened surfaces 42 for coaction with a handle or turning tool to permit manual operation of the valve.

When the valve is in the open position shown in Fig. 2, the engaging lug 30 on the outer cam member is in engagement with the stop 27 of the inner cam member. By rotating the stud 34 in a clockwise direction, the lug 30 will ride up the inclined cam surface 24 (see Fig. 6) until it hits the stop shoulder 26. This will cause inward movement of the cam member 13, valve stem 16, and valve 17, against the tension of the coil spring 20, to bring the valve to the closing position of Fig. 1.

To the open the valve is merely necessary to give the stud 34 a quick twist of about 180° in a counterclockwise direction. The spring 20 will then quickly move the valve to the open position of Fig. 2.

The operation of the form of the invention shown in Fig. 7 is the same except that there are no positive stops such as the shoulders 26 and 27, it being merely necessary in closing the valve to rotate the stud 34 until further rotation is prevented because of seating of the valve 17.

It is apparent that all portions of this valve may be quickly and easily disassembled for cleaning by merely removing the union nut 38. This permits withdrawal of the disc 36, outer cam 14, inner cam member 13 and attached valve and valve stem, and spring 20. Because of the improved construction there are no threaded parts within the valve casing, and there are no inaccessible pockets in any of the parts to retain food particles or foreign matter. In those prior constructions where there is internal threading on certain of the parts it is sometimes impossible to do a proper cleaning job, and objectionable sanitary conditions may result.

Various changes and modifications may be made without departing from the spirit of the invention, and all of such changes are contemplated as may come within the scope of the claims.

What I claim is:

1. In a valve having a casing provided with a valve seat and having a tubular extension disposed opposite to said valve seat, a valve cooperable with said seat and having a stem connected thereto and projecting toward the casing extension, a member slidable in said casing extension and connected to the outer end of the valve stem and having a cylindrical side wall whose outside diameter is substantially equal to the inside diameter of the tubular extension, a spring surrounding the valve and valve stem and having one end engaging the casing around the valve seat and having its other end engaging the slidable member, said slidable member having the cylindrical surface of said side wall adjacent the inner wall of the tubular extension and having the outer end of said side wall formed with a circular cam surface, an adjustment member having an outside diameter substantially equal to the inside diameter of the tubular extension rotatably mounted in said casing extension and having means engageable with the cam surface of said slidable member for causing slidable movement of the latter in a valve closing direction in response to rotation of the adjustment member, said adjustment member having an enlarged head and said tubular extension of the casing being formed with an annular seat which is engaged by said head to prevent inward axial movement, and means including a union nut threaded on said casing extension for removably holding the adjustment member in position with the head thereof in engagement with the annular seat of the tubular extension.

2. In a valve having a casing provided with a valve seat and having a tubular extension disposed opposite to said valve seat, a valve cooperable with said seat and having a stem connected thereto and projecting toward the casing extension, a member slidable in said casing extension connected to the outer end of the valve stem and having a cylindrical slide wall whose outside diameter is substantially equal to the inside diameter of the tubular extension, a groove on the inside wall of the tubular extension and running axially thereof, means connected to said slidable member and cooperable with said groove to prevent rotation of said slidable member, a spring surrounding the valve and valve stem and having one end engaging the casing around the valve seat and having its other end engaging the slidable member, said slidable member having the cylindrical surface of its side wall positioned adjacent the inner surface of the wall of the tubular extension, and having its outer end formed with a circular cam surface, an adjustment member having an outside diameter substantially equal to the inside diameter of the tubular extension rotatably mounted in said casing extension and having means engageable with the cam surface of said slidable member for causing slidable movement of the latter in a valve closing direction in response to rotation of the adjustment member, said adjustment member having an enlarged head and said tubular extension of the casing being formed with an annular seat which is engaged by said head to prevent inward axial movement, a non-rotatable retaining disc outwardly of said adjustment member, and a union nut threaded on said casing extension for removably holding the adjustment member in position with the head thereof in engagement with the annular seat of the tubular extension.

FERDINAND HINRICHS.

REFERENCES CITED

The following references are of record in the file of this patent:

UNITED STATES PATENTS

| Number | Name | Date |
|---|---|---|
| 146,874 | Coleman | Jan. 27, 1874 |
| 329,807 | Boyle | Nov. 3, 1885 |
| 852,155 | Bashlin | Apr. 30, 1907 |
| 1,403,056 | Noble | Jan. 10, 1922 |
| 2,310,485 | Wyckoff | Feb. 9, 1943 |
| 2,336,700 | Pepersack | Dec. 14, 1933 |

FOREIGN PATENTS

| Number | Country | Date |
|---|---|---|
| 338,959 | Italy | Mar. 31, 1936 |